(12) United States Patent
Crockett

(10) Patent No.: US 10,114,625 B2
(45) Date of Patent: Oct. 30, 2018

(54) HANDLING CROSS-THREAD METHOD CALLS

(75) Inventor: Paul A. Crockett, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1680 days.

(21) Appl. No.: 13/486,806

(22) Filed: Jun. 1, 2012

(65) Prior Publication Data
US 2012/0311553 A1    Dec. 6, 2012

(30) Foreign Application Priority Data
Jun. 2, 2011    (EP) .................................... 11168600

(51) Int. Cl.
*G06F 8/41*    (2018.01)

(52) U.S. Cl.
CPC .................................... *G06F 8/458* (2013.01)

(58) Field of Classification Search
CPC .............................................. G06F 8/30–8/52
USPC .................................. 717/106–108, 151–161
See application file for complete search history.

(56) References Cited

U.S. PATENT DOCUMENTS

| | | | |
|---|---|---|---|
| 5,822,588 A | 10/1998 | Sterling et al. | |
| 7,219,329 B2 | 5/2007 | Meijer et al. | |
| 7,356,803 B2 | 4/2008 | Bau, III et al. | |
| 7,676,791 B2 * | 3/2010 | Hamby et al. | 717/116 |
| 7,788,650 B2 * | 8/2010 | Johnson et al. | 717/140 |
| 8,151,252 B2 * | 4/2012 | Song et al. | 717/140 |
| 8,769,491 B1 * | 7/2014 | Conti | G06F 8/314 |
| | | | 709/201 |
| 2002/0103847 A1 | 8/2002 | Potash | |
| 2004/0040029 A1 | 2/2004 | Debbabi et al. | |
| 2007/0143323 A1 | 6/2007 | Vanrenen et al. | |
| 2010/0205580 A1 * | 8/2010 | McAllister et al. | 717/106 |
| 2010/0229160 A1 | 9/2010 | Ishizaki | |
| 2011/0202907 A1 * | 8/2011 | Dice et al. | 717/148 |

FOREIGN PATENT DOCUMENTS

CN    101281470 A    10/2008

OTHER PUBLICATIONS

PCT Application No. PCT/IB2012/052565 International Search Report and Written Opinion, dated Oct. 18, 2012, 10 pgs.
PCT Application No. PCT/IB2012/052565 International Preliminary Report on Patentability, dated Dec. 2, 2013, 5 pg.
(Continued)

*Primary Examiner* — Wynuel Aquino
(74) *Attorney, Agent, or Firm* — Cuenot, Forsythe & Kim, LLC

(57) ABSTRACT

A method of compiling source code into object code for a multi-threaded runtime environment is disclosed. Source code is compiled into object code using a compilation engine. Marshalling attributes associated with method code intended for executing in a secondary thread are identified. The marshalling attributes and the method code are rewritten as marshaled method code for executing the method code in the secondary thread according to the identified marshalling attributes.

20 Claims, 10 Drawing Sheets

| Table 500 for Marshalling Attribute Structure and Example | |
|---|---|
| Marshalling Attribute Structure 502 | @ThreadMarshalling(thread_parameter, marshalling_parameter) |
| Marshalling Attribute Example 504 | @ThreadMarshalling(AWT, CallType.Sync) |
| Structure 502 in use | @ThreadMarshalling(thread_parameter, marshalling_parameter)<br>method |
| Example 504 in use | @ThreadMarshalling(AWT, CallType.Sync)<br>void someFunction(...) {<br>    <Normal processing...><br>} |

(56) References Cited

OTHER PUBLICATIONS

Watkins, D. "An Introduction to the Common Language Infrastructure (CLI)," [Online] Microsoft Research, Cambridge, UK, in Proc. of 18th ACM SIGPLAN Conf. on Object-Oriented Programming, Systems, Languages and Applications, OOPSLA 2003, Oct. 26, 2003, retrieved from the Internet: <http://user.cs.tu-berlin.de/~mwerner/discourse/BlockLVS04/slides/CommonLanguageInfrastructure.pdf>, 116 pg.

Lowy, J., "Chapter 2: .NET Component-Oriented Programming Essentials, Assembly Metadata," In Programming .NET Components,Chap. 2, pp. 37-43, Jul. 2005, O'Reilly Media, Inc., 2009.

\* cited by examiner

| Table 500 for Marshalling Attribute Structure and Example | |
|---|---|
| Marshalling Attribute Structure 502 | @ThreadMarshalling(thread_parameter, marshalling_parameter) |
| Marshalling Attribute Example 504 | @ThreadMarshalling(AWT, CallType.Sync) |
| Structure 502 in use | @ThreadMarshalling(thread_parameter, marshalling_parameter) method |
| Example 504 in use | @ThreadMarshalling(AWT, CallType.Sync) void someFunction(...) { <Normal processing....> } |

Figure 7

| Table 506 for Marshalling Attribute Terms and Example | |
|---|---|
| Column 508 for Terms | Column 510 for Examples |
| thread_parameter | AWT |
| marshalling_parameter | CallType.Sync |
| Method | void someFunction(...) |
| Normal processing | {<br>    <Normal processing...><br>} |

Figure 8

| Table 900. Comparing actual code and source code equivalent | | |
|---|---|---|
| Column A Stages | Column B Actual Code | Column C Source Equivalent |
| Stage 1 Source Code 32 | `@ThreadMarshalling (AWT, CallType.Sync) void someFunction(...) { <Normal processing...>}` | `@ThreadMarshalling (AWT, CallType.Sync) void someFunction(...) { <Normal processing...>}` |
| Stage 2 Pre-Marshalled Object Code 212A | `@ThreadMarshalling (AWT, CallType.Sync) 22..22 33..33` | `@ThreadMarshalling (AWT, CallType.Sync) void someFunction(...) { <Normal processing...>}` |
| Stage 3 Marshalled Object Code 36 | `22..22 11..22 22..11 33.. 33` | `void someFunction(...) { if (!SwingUtilities .isEventDispatchThread()) { SwingUtilities.invokeAndWait(new Runnable() { public void run() { someFunction(...); } }); return; } <Normal processing...>}` |

Figure 9

| Marshalled Code Data 214 | | |
|---|---|---|
| Column A Marshalling Parameters | Column B Marshalling Build Code | Column C Marshalling Build Code – Source Code |
| Example 1 AWT, CallType.Sync | 11...99 99...11 | if (!SwingUtilities.isEventDispatchThread()) { SwingUtilities.invokeAndWait( new Runnable() { public void run() { <Method> } } ); return; } |
| Example 2 AWT, CallType.Async | 12...99 99...12 | if (!SwingUtilities.isEventDispatchThread()) { SwingUtilities.invokeLater( new Runnable() { public void run() { <Method> } } ); return; } |
| Example 3 WinForms, CallType.Sync | 13...99 99...13 | if (InvokeRequired) { Invoke(<Method>); return;} |
| Example 4 WinForms, CallType.Async | 14...99 99...14 | if (InvokeRequired) { BeginInvoke(<Method>); return;} |

Figure 10

HANDLING CROSS-THREAD METHOD CALLS

CROSS-REFERENCE TO RELATED APPLICATIONS

This application claims the benefit of European Patent Application 11168600.2, filed Jun. 2, 2011, which is incorporated herein by reference in its entirety.

BACKGROUND

Field of the Invention

The present disclosure relates to handling cross-thread method calls, and more specifically, to compiling object code for a secondary thread in a multi-threaded runtime environment in a computing system.

Description of the Related Art

A multi-thread runtime environment typically has two or more threads dedicated to specific types of processing. For example, a primary execution thread for performing a central process and a secondary thread for user interactions including updating a graphical user interface showing the progress of the central process and perhaps allowing the user to cancel, pause or control the central process. The central process is performed more efficiently in a dedicated thread when it is isolated from other processes in other threads. While the problem is applicable to two or more threads it can be described with respect to just two threads.

One challenge for multi-threaded runtime environments is that it is often necessary for threads to interact with each other, but if interactions are not handled correctly, then the efficiency of multiple threads is lost. Interactions can involve passing data using a shared data structure, or it can be more complex and involve method calls between threads. An example of marshalling is a first method in the primary thread calling a second method in the secondary thread and waiting for completion of the second method before continuing the first method in the primary thread. Waiting is synchronous marshalling. Another example is where a first method in a primary thread will not wait for a second method in a secondary thread to complete. Not waiting is asynchronous marshalling.

Known computer language libraries provide utility methods to facilitate marshalling a method on a specific thread, for instance a thread dedicated to a graphical user interface. However, the responsibility for marshalling the method is placed on the method and the programmer. This means that the called method must contain code instructions for checking whether it is executing on the correct thread; and if not, the called method must perform marshalling itself. If the number and type of methods that require marshalling is large, then adding correctly formed code to each method becomes cumbersome. If the programmer uses an incorrect syntax then there is increased risk of error when the method is invoked on the wrong thread.

SUMMARY

A method of compiling source code into object code for a multi-threaded runtime environment is disclosed. Source code is compiled into object code using a compilation engine. Marshalling attributes associated with method code intended for executing in a secondary thread are identified. The marshalling attributes and the method code are rewritten as marshaled method code for executing the method code in the secondary thread according to the identified marshalling attributes.

BRIEF DESCRIPTION OF THE SEVERAL VIEWS OF THE DRAWINGS

The invention may be better understood by combining the description referring to drawings below, in which the same or similar reference numbers represent the same or similar components throughout the drawings. The drawings are included within the description and constitute a part of the description along with the detailed description below, and are used to explain the preferred embodiments of the invention illustratively and illustrate the principal and advantage of the embodiments of the invention. In the drawings.

FIG. 7 is a table of marshalling attribute examples.

FIG. 8 is a table of marshalling attribute terms.

FIG. 9 is a table comparing example object code and source code equivalents for three stages.

FIG. 10 is a table of marshalling build code examples.

DETAILED DESCRIPTION

Figure 1:
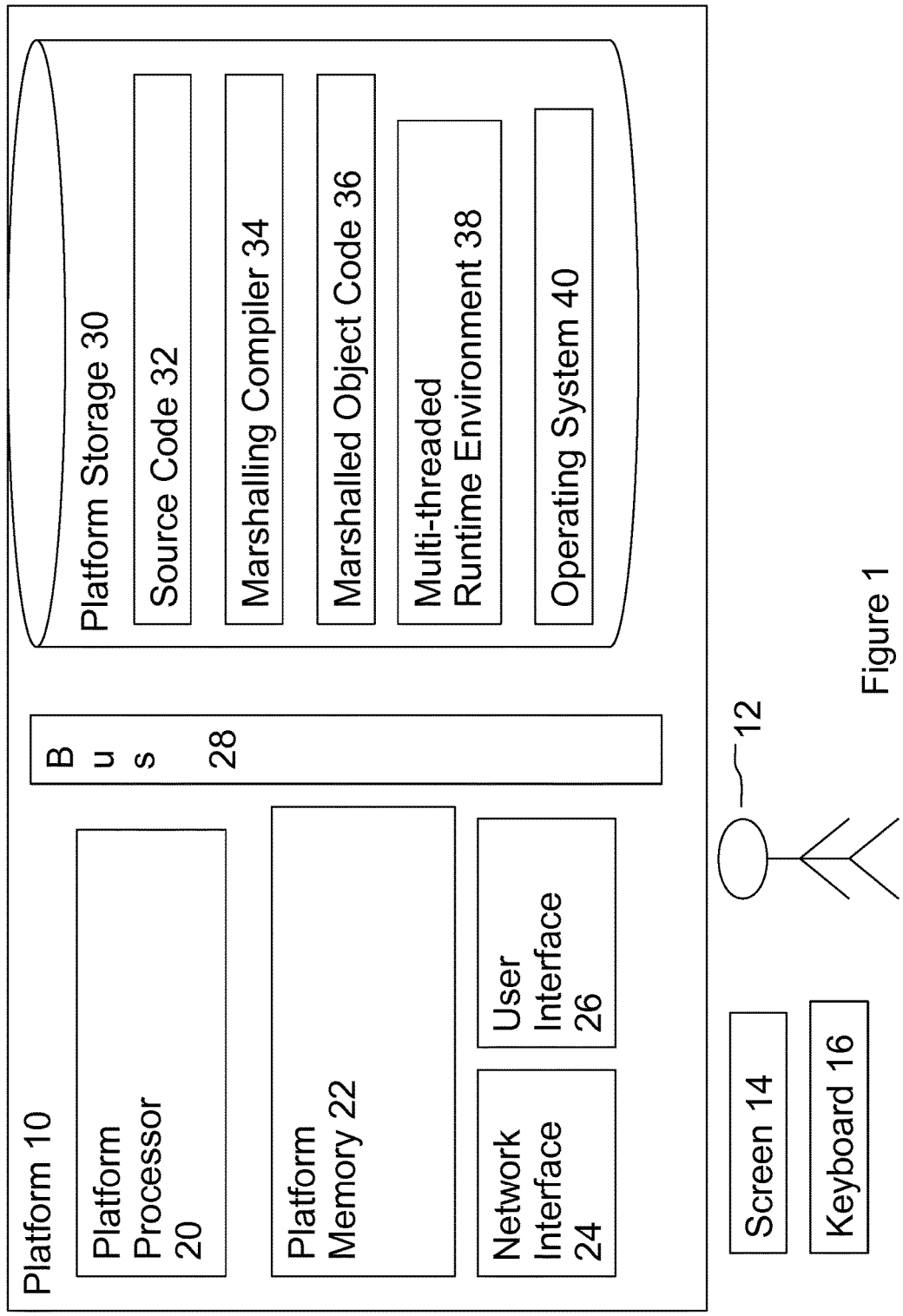
FIG. 1 is a deployment diagram of a platform.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain (or store) a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. Each block of the flowchart illustrations and/or block diagrams, and combinations of blocks in the flowchart illustrations and/or block diagrams, can be implemented using computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In various aspects, a method is provided wherein the marshaled method code is object code wherein compilation takes place before or during the rewriting step. The rewriting step takes place before execution and may be part of a just-in-time compilation. The compilation engine does not compile the one or more marshalling attributes associated with the method code but copies them from the object code to the source code as is.

A method is provided wherein a marshalling attribute specifies which thread is to execute the method code and which one or more marshalling rules are to be applied to the method. The marshalling attribute is used either at compile, post-compile or just-in-time compile to produce program instructions. The marshalling attributes are method independent and the same attributes can be applied to any method. An attribute of method code is metadata associated with the method that is stored in the compiled object code alongside the executable code but not compiled. Conversely, comments in the source code are completely ignored by a compiler and not transferred to object code. The non-compiled metadata are called annotations in Java language and called attributes in the .NET environment.

The marshalling rules provide a succinct way to express threading requirements such as whether the method should operate synchronously or asynchronously to the caller. The attributes comprise an attribute prefix and one or more marshalling parameters inside parenthesis.

Referring to FIG. 1, there is shown a deployment diagram of platform 10 for interaction with user 12 using screen 14 and keyboard 16. Platform 10 comprises: platform processor 20; platform memory 22; network interface 24; user interface 26; bus 28 and platform storage 30. An example of platform 10 is an IBM Power 770 server which would normally have at least two platform processors, in this example only one is described.

Processor 20 takes instructions and data from platform memory 22 for performing logical operations on data according to the instructions. Examples of instructions include add data, subtract data, read data, write data. An example of a processor is an IBM POWER7 processor.

Platform memory 22, faster than platform storage 30, is designed for fast access so that it does not limit processor speed. In operation processor 20 accesses and executes code stored in platform memory 22. An example of execution memory is 8 gigabyte to 512 gigabyte registered dual in-line memory modules (RDIMM) comprising a series of dynamic random access memory (DRAM) integrated circuits.

Network interface 24 communicates with other platforms connected to platform 10 on a network, for example, a local area network (LAN) or the Internet. Typically such communications are service calls when platform 10 will request another network device to provide a service such as performing an operation on supplied data.

User interface 26 receives input from user 12 via keyboard 16, mouse or other human input device. The user interface 26 also sends output to user 12 via screen 14, speakers or other human output device.

Bus 28 provides communication paths for instructions and data between processor 20, platform memory 22, network interface 24, user interface 26 and platform storage 30.

Storage memory 30 is slower than platform memory 22 but is designed to hold more data. An example of storage memory is an 8 terabyte disk drive. When the platform is not operating, then platform memory 22 is empty; platform storage 30 stores both execution code for upload to platform memory and data for use with the execution code. Platform storage 30 comprises source code 32; marshalling compiler 34; marshalled object code 36; multi-threaded runtime environment 38; and an operating system 40.

Source code 32 is for a multi-threaded application that is written with two or more separate processes for execution in two or more threads in the multi-threaded runtime environment.

Marshalling compiler 34 compiles the source code 32 into object code 36 and introduces marshalling optimizations.

Marshaled object code 36 comprises or will comprise the output of the marshalling compiler 34 and contains object code and marshalling optimizations.

Multi-threaded runtime environment 38 is a runtime environment that provides for multiple execution threads executing separate methods. Examples of such multi-threaded environments are Java Runtime Environment (JRE) and Microsoft .NET runtime environment. As described, the multi-threaded runtime environment is a software layer that runs on the operating system. In other aspects, the multi-threaded runtime environment could be an operating system, a multi-processor platform (e.g. the IBM Power 770) or a virtual multi-threaded runtime environment.

Operating system 40 supports the multi-threaded runtime environment. For instance, either of IBM AIX and Linux operating systems support Java Runtime Environment.

Figure 2:
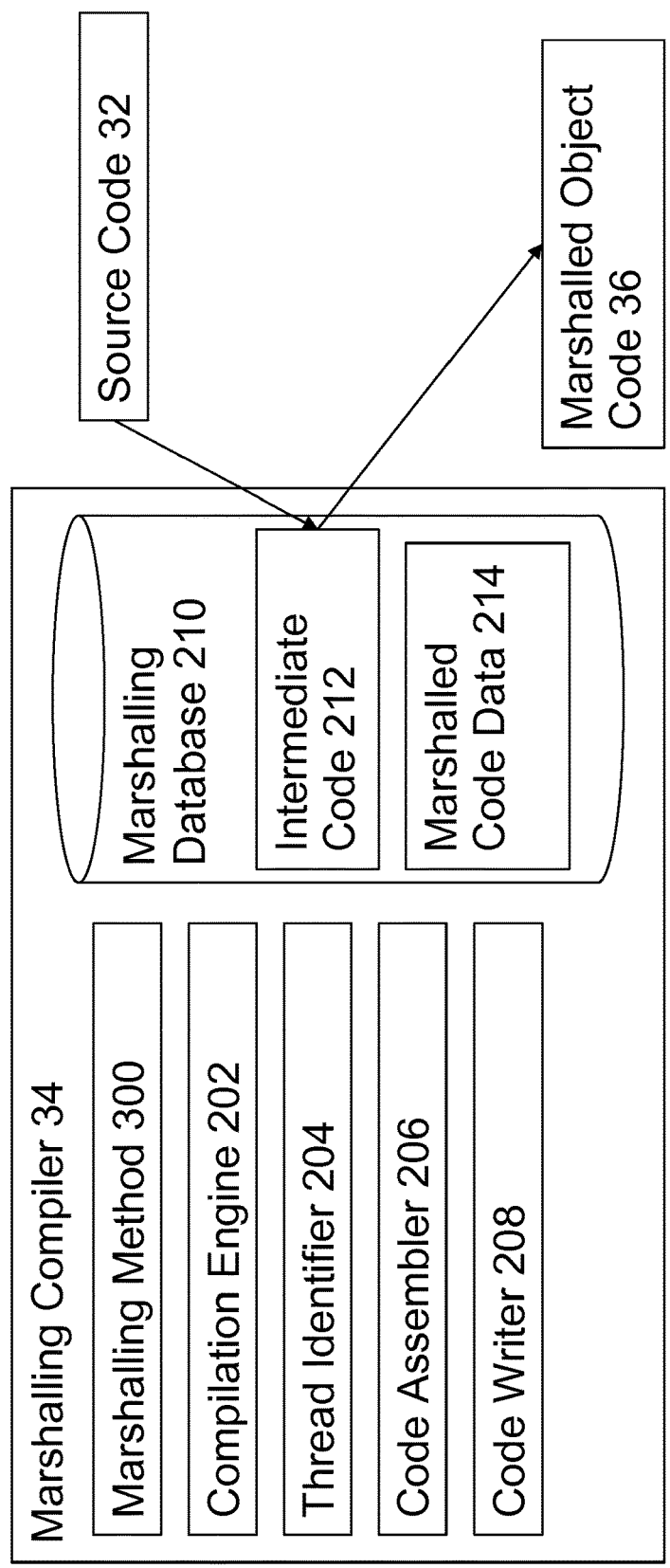
FIG. 2 is a component diagram of a marshalling compiler.

Referring to FIG. 2, the marshalling compiler of the embodiments is described. Marshalling compiler 34 comprises marshalling method 300; compilation engine 202; thread identifier 204; code assembler 206; code writer 208; and marshalling database 210.

Marshalling method 300 is the method for managing the components of the embodiment and is described in more detail below.

Compilation engine 202 is a standard compiler for compiling source code into object code. In certain aspects, compilation engine 202 compiles an interpreted language like Java from Java source code into Java byte code; but in other embodiments compilation engine 202 compiles a low level language like C from C source code to machine (e.g. POWER7) object code. One aspect of the compilation engine is that it copies attribute code (including marshalling attribute code) from source code into the object code because marshalling is performed on the object code. Where marshalling is performed before compilation, then copying attribute code is not so important.

Thread identifier 204 identifies a marshalling attribute and method code and passes them to the code assembler 206.

Code assembler 206 assembles marshalled method code based on the identified marshalling attribute and the identified method code. The assembled marshalled method code is made available to the code writer 208.

Code writer 208 writes the assembled marshalled method code into intermediate code 212 (replacing the existing unmarshalled method code) and ultimately forming the completed marshaled object code 36.

Marshalling database 210 is for the data used by marshalling compiler 34 and comprises intermediate code 212 and marshaled code data 214.

Intermediate code 212 is code stored in the intermediate form before it is fully transformed into marshalled object code 36. In certain aspects, the intermediate code is object code (pre-marshalled object code 212A) that has been compiled from source code 32 with marshalling attributes intact. In another aspect, intermediate code 212 is source code containing marshalled methods rewritten from source code 32 and containing marshalling attributes and associated methods (marshaled source code 212B).

Marshaled code data 214 comprises the transformation code used to transform marshalling attributes and associated method into marshalled method code. Marshalled code data 214 is explained in more detail below by example with reference to FIG. 10.

Figure 3:
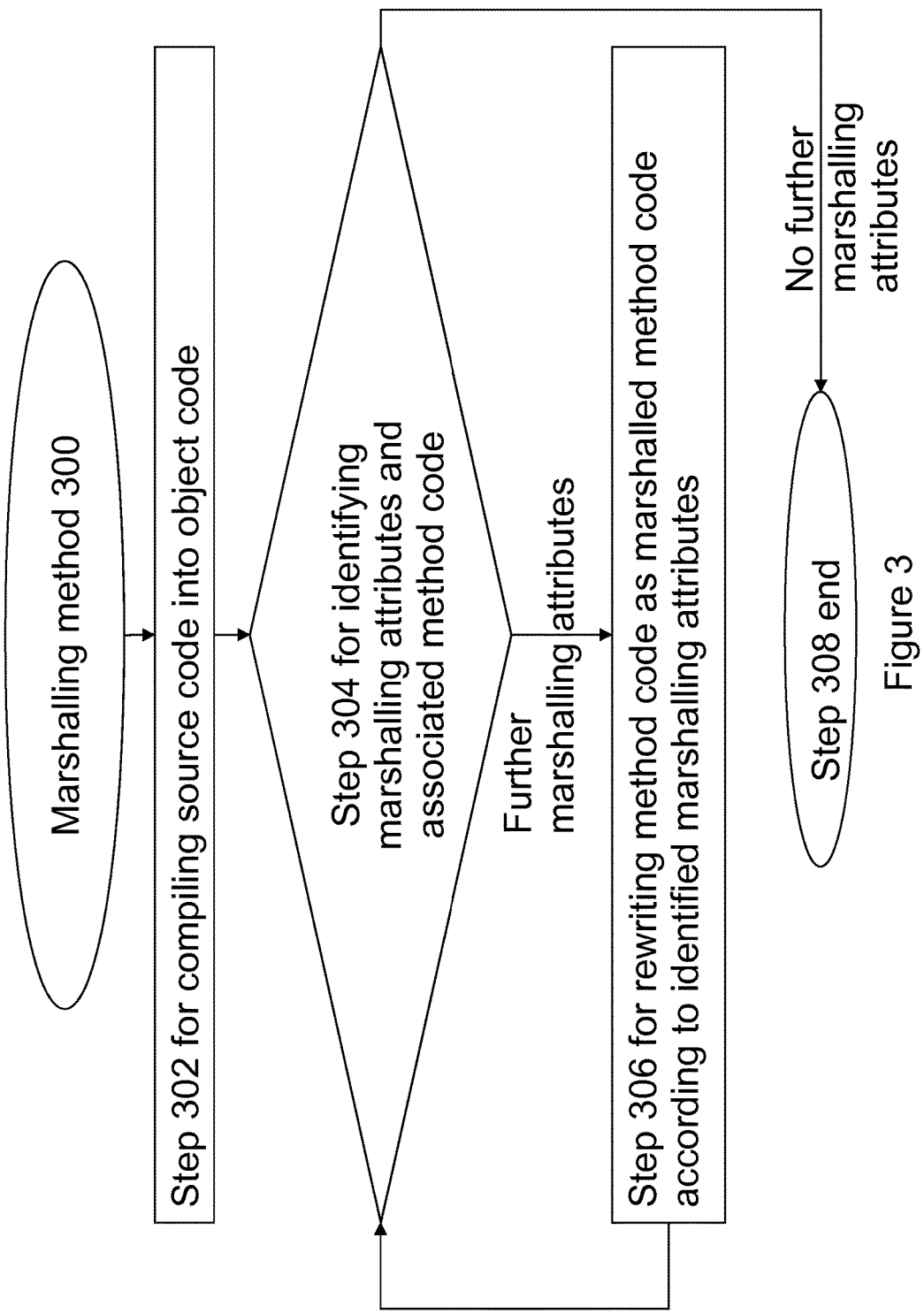
FIG. 3 is a method diagram of the compilation method.

Referring to FIG. 3, marshalling method 300 comprises logical process steps 302 to 308.

Step 302 compiles source code into intermediate code 212 using compilation engine 202. In certain aspects, compilation is performed before logical process step 306 whereas in other aspects, compilation is performed after the logical process step 306—see description below with reference to FIGS. 4 and 5.

Step 304 identifies a marshalling attribute associated with the method code. The attribute is positioned just before or adjacent the method code so that the method code is the next term. If a further marshalling attribute is identified, then the next step is step 306. If no further marshalling attributes are identified, then marshalling method 300 ends at step 308.

Step 306 rewrites method code as marshalled method code according to the identified marshalling attributes. Step 306 loops back to step 304.

Step 308 is the end of marshalling method 300 when there are no further marshalling attributes in the intermediate code 212.

Figure 4:
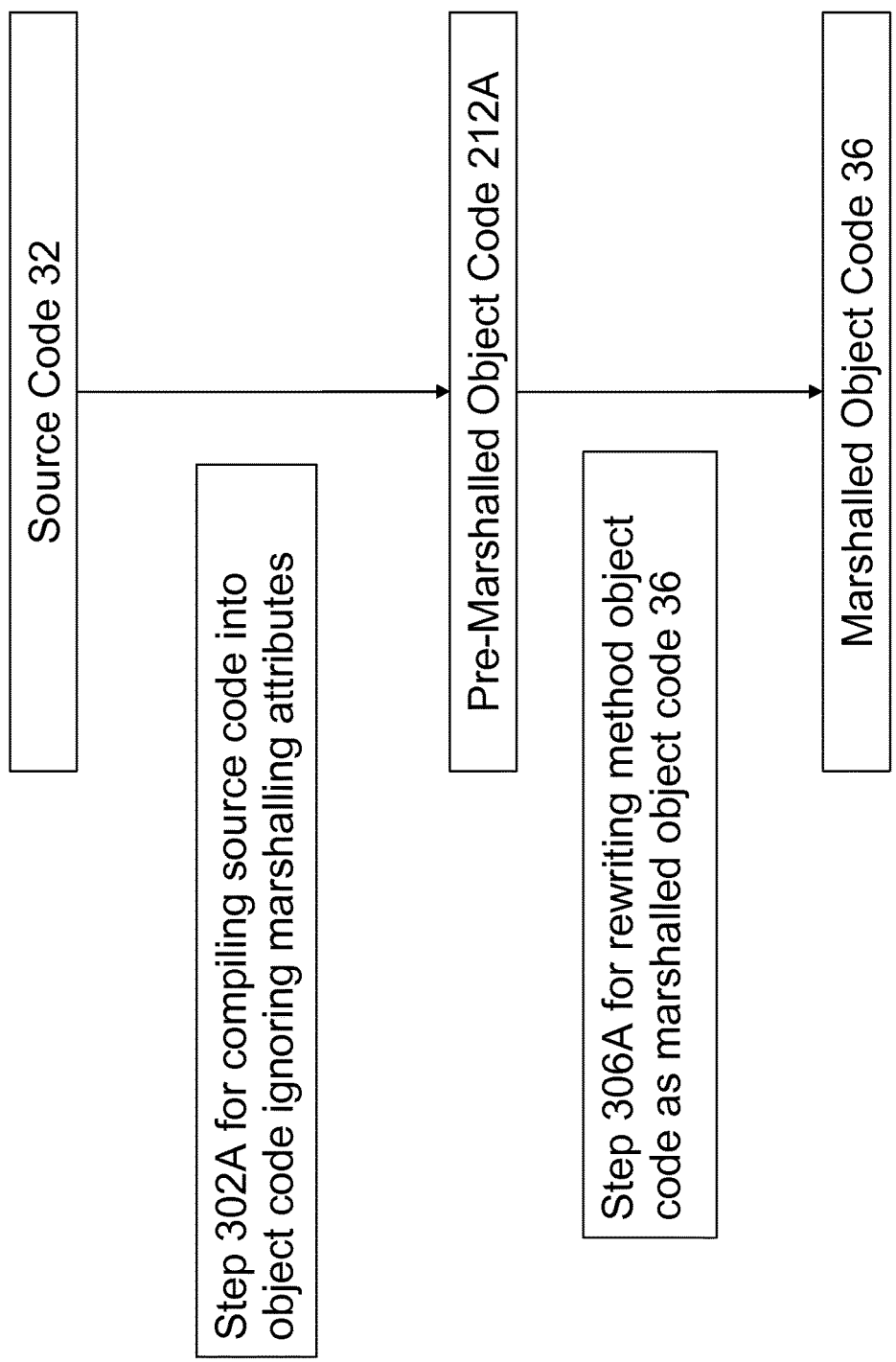
FIG. 4 is a state diagram of the transformation stages of the marshaled object code.
Figure 5:
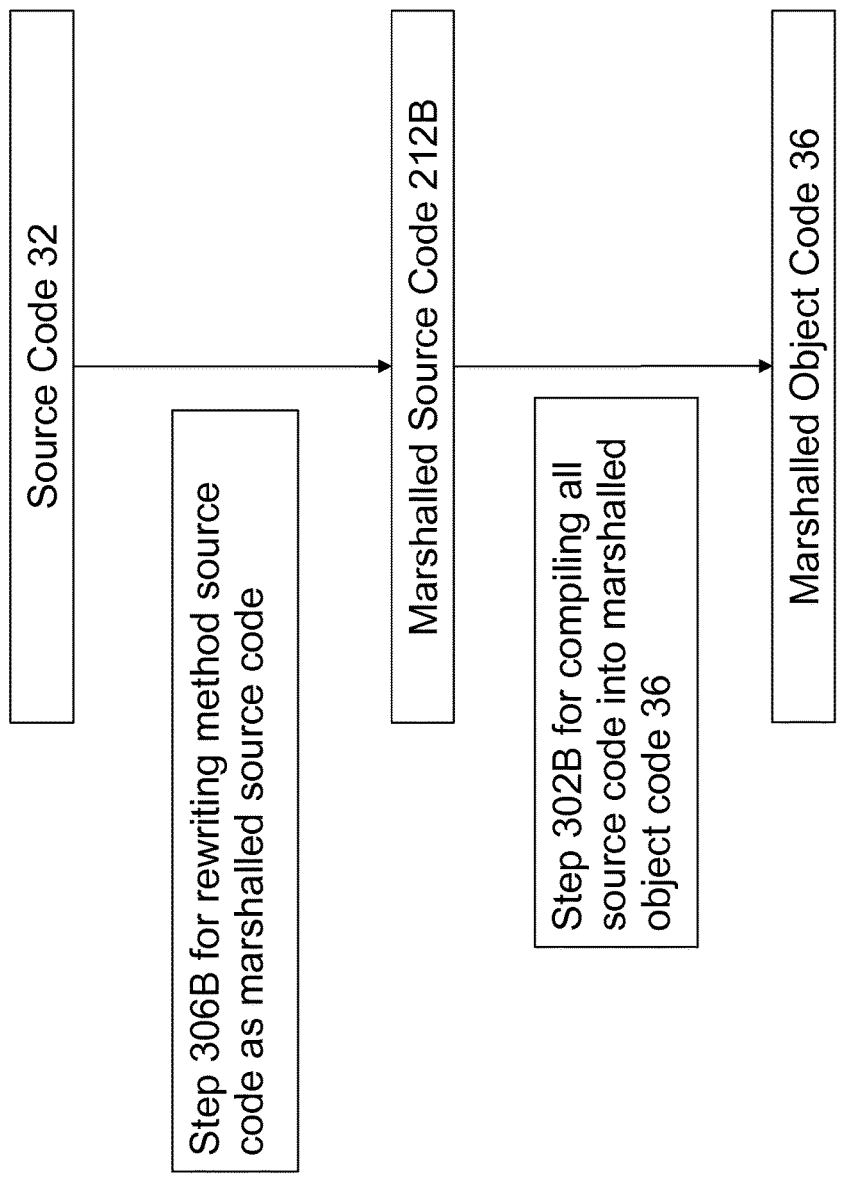
FIG. 5 is a state diagram of the transformation stages of the marshaled object code.

FIGS. 4 and 5 are state diagrams showing the stages from source code 32 to intermediate code 212 to marshaled object code 36.

Referring to FIG. 4, source code 32 is compiled at step 302A into pre-marshalled object code 212A (pre-marshalled object code is a type of intermediate code 212) with marshalling attributes copied across. Pre-marshalled object code 212A is then rewritten at step 306A as marshaled object code 36.

Referring to FIG. 5, source code 32 is rewritten at step 306B as marshalled source code 212B (marshalled source code 212B is another type of intermediate code 212). Marshalled source code 212B is then compiled, at step 302B, into marshaled object code 36.

Figure 6:
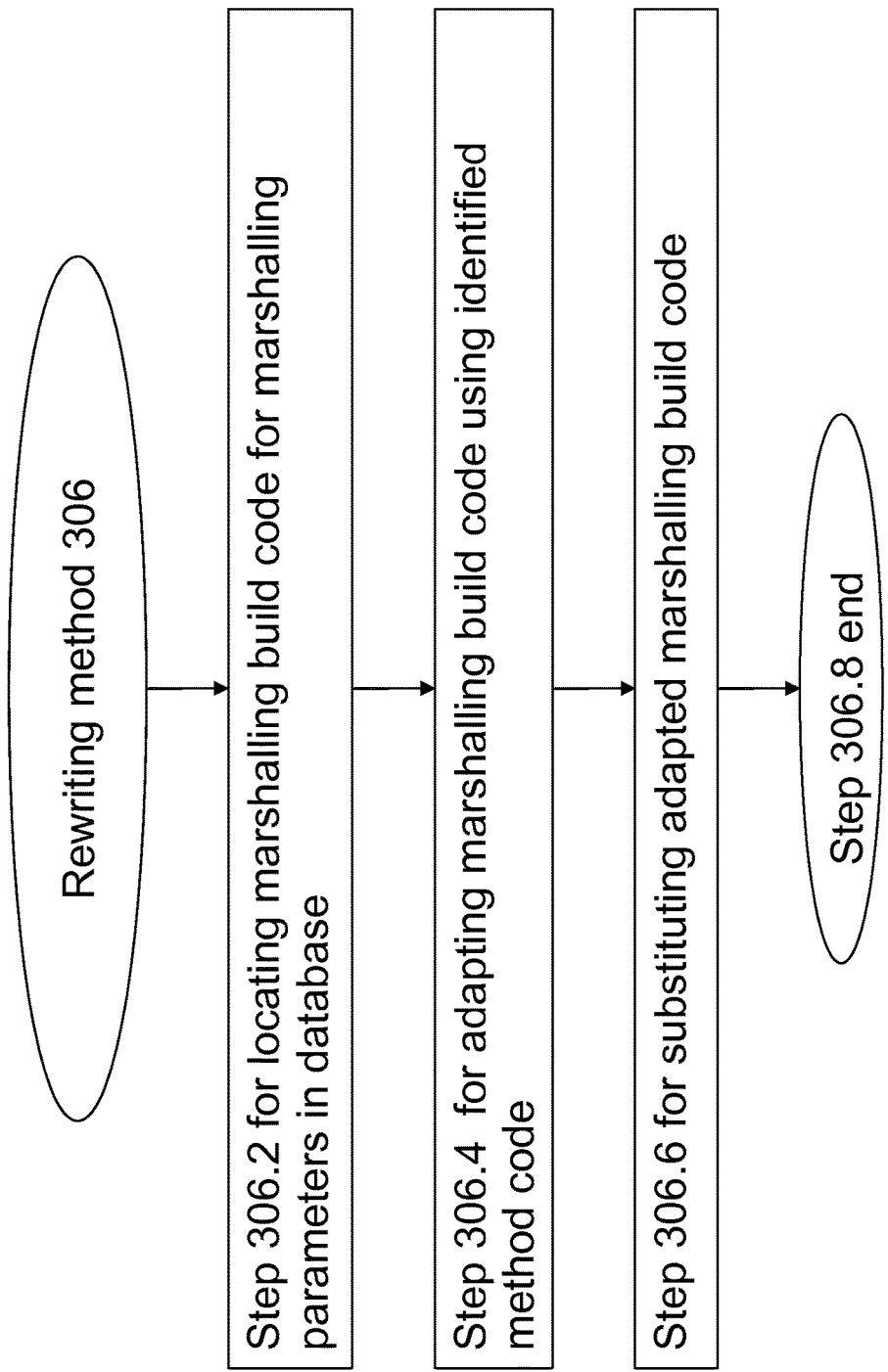
FIG. 6 is a method diagram for an optimized rewriting method.

Referring to FIG. 6, an optimized rewriting step 306 comprises logical process steps 306.2, 306.4, 306.6 and 306.8.

Step 306.2 locates marshalling build code for marshalling parameters in the marshalling database 210. Specifically marshalled code data 214 comprises mappings for marshalling parameters and marshalling build code.

Step 306.4 adapts the located marshalling build code using the identified method code to form the marshalled method code. The marshalling build code is adapted by inserting a call to the method code at a tagged point. In the example of FIG. 10, the tag is <Method>.

Step 306.6 substitutes marshalling attributes and method code in the intermediate code 212 with marshalled method code. In certain aspects, the method code and marshalled method code are both object code. In other aspects, the method code and marshalled method code are source code.

Step 306.8 signals the end of the rewriting method.

Table 500, FIG. 7, details marshalling attribute structure and examples. Marshalling attribute structure 502 is expressed by the following schematic code:

"@ThreadMarshalling(thread_parameter, marshalling_parameter)"

The "@ThreadMarshalling" portion is an attribute prefix for identifying the attribute as a marshalling attribute. This syntax is specific to Java and other embodiments a different syntax. The "@" portion identifies a general attribute and the "ThreadMarshalling" portion identifies the attribute as a marshalling attribute. Parenthesis ( . . . ) surrounds the thread marshalling parameters of the marshalling attribute. Thread marshalling parameters comprise: "thread_parameter" and "marshalling_parameter".

"thread_parameter" identifies the name of the thread that the associated method is to execute in. "marshalling_parameter" identifies the type of thread marshalling that is to be performed.

A marshalling attribute example 504 comprises the following source code example:

"@ThreadMarshalling(AWT, CallType.Sync)"

"thread_parameter" is represented by "AWT" in example 504.

"marshalling_parameter" is represented by "CallType. Sync" in example 504.

Marshalling attribute structure 502 in use is followed by a method represented here by the term "method" and comprises the following schematic code:

"@ThreadMarshalling(thread_parameter, marshalling_parameter) method"

Attribute prefix "@ThreadMarshalling ( . . . )" decorates the method code that follows the parenthesis. In use, marshalling attribute example 504 is followed by the source method code or object method code and comprises the following source code example:

"@ThreadMarshalling(AWT, CallType.Sync) void someFunction( . . . ) {
<Normal processing . . . >}"

The method in example 504 in use is "void someFunction( . . . )" where the ellipsis " . . . " represents method code.

"void" defines a method that does not return a value but any method definition can be used instead.

"{<Normal processing . . . >}" represents the normal processing of the program where the ellipsis " . . . " represents code for normal processing.

FIG. 8 table 506 maps the above details of the marshalling attribute structure and example described above. Column 508 shows the terms, and column 510 shows the corresponding examples.

Referring to FIG. 9, table 900 compares example actual code and source code for three stages. Table 900 comprises three columns: column A containing stage name; column B containing the actual code that represents the stage; and column C containing the source code equivalent of the actual code.

Column A contains three stages: stage 1 (source code 32); stage 2 (intermediate code 212); and stage 2 (marshaled object code 36).

The actual source code at stage 1 (Cell 900B1) comprises a marshalling attribute and a method definition:

"@ThreadMarshalling(AWT,CallType.Sync) void someFunction( . . . ){<Normal Processing . . . >}"

The method is represented by an abstract method definition "void someFunction( . . . )". "<Normal processing . . . >" represents the program code following the method for thread marshalling. The source code equivalent at this stage (Cell 900C1) is exactly the same.

In certain aspects, step 302A compiles source code to pre-marshalled object code 212A and ignores the marshalling attributes. The actual pre-marshalled object code 212A at stage 2 (Cell 900B2) comprises the ignored marshalling attribute and the code bytes "22 . . . 22 33 . . . 33". In this example "void someFunction( . . . )" has been compiled into a series of bytes "22 . . . 22". <Normal processing . . . > has been compiled into a series of bytes "33 . . . 33". The source code equivalent (Cell 900C2) is exactly the same as before (Cell 900C1).

When step 306A rewrites pre-marshalled object code 212A as marshalled object code 36; code assembler 206 reads the marshalling attributes and parameters "AWT, CallType.Sync" to determine that an associated method call must be marshalled to an AWT event processing thread and should wait for the method to return before continuing. Using this information and the marshalling build code acquired from marshalled code data, the code writer 208 locates an associated method "22 . . . 22" by parsing the subsequent code; adapts marshalling build code using a call to the located method and inserts the marshalling method code into and around the compiled method.

The actual code at stage 3 (Cell 900B3) is:

"22 . . . 22 11 . . . 22 22 . . . 11 33 . . . 33"

"22 . . . 22" represents the method.

"11 . . . 22 22 . . . 11" represents the marshalled method code with the inserted method call to the method.

The source equivalent at stage 3 (Cell 900C3) is:

"void someFunction( ) {
if (!SwingUtilities.isEventDispatchThread( )) {
SwingUtilities.invokeAndWait(new Runnable( ) {
public void run( ) { someFunction( ); }
}); return;
<Normal processing...>}"

Referring to FIG. 10, further examples marshalled code data 214 are described. Marshalled code data 214 is a data structure comprising a mapping between marshalling parameters and the code that is to be used for marshalling. In certain aspects, marshalled code data 214 need only comprise columns A and B; but in other aspects, marshalled code data 214 need only comprise columns A and C. For the purposes of explanation, all three columns are described in the context of the combined data structure.

Column A contains four examples of marshalling parameters; in all four examples thread_parameter is delimited from marshalling_parameter by a comma.

Column A contains two types of marshalling parameter: "AWT" and "WinForms". Each marshalling parameter corresponds to a particular thread in the multi-thread runtime environment, in this example, the AWT thread and the Winforms thread. The AWT thread is a thread for processing graphical user interface events in Java. The WinForms thread is for processing Microsoft Windows Forms events in .NET.

Column A contains two types of marshalling parameter: synchronous marshalling "CallType.Sync" and asynchronous marshalling "CallType.Async". Synchronous marshalling requires that the called method should be synchronous with the calling method, effectively the called method waits until the calling method is complete. Asynchronous marshalling does not require that the called method be synchronous with the calling method.

Column C contains the marshalling build code in source code form for the respective marshalling parameters.

Column B contains marshalling build code in object code form, effectively compiled from the source code of column C. In certain aspects, column C may be included even if it is used only indirectly and vice versa for other aspects. Each example is represented by a start and end byte separated by ellipsis to represent the code that should be there: "11 . . . 11"; "12 . . . 12"; "13 . . . 13"; and "14 . . . 14". Inside each example of marshalling building code is a tag identifier representing the space where the method call is to be inserted. In this example the tag identifier is "99 99".

Therefore the four examples are represented in code by: "11 . . . 99 99 . . . 11"; "12 . . . 99 99 . . . 12"; "13 . . . 99 99 . . . 13"; and "14 . . . 99 99 . . . 14". In the example of FIG. 9, "22 . . . 22 11 . . . 22 22 . . . 11 33 . . . 33", the "22 22" is a method call that has replaced tag identifier "99 99".

The thread marshalling parameters and corresponding source code examples are described as follows:

EXAMPLE 1

"AWT, CallType.Sync" represents a call to a synchronous method in an AWT library: execution of corresponding marshalling source code would check the executing thread is the thread normally associated with the AWT library using an expression "!SwingUtilities.is EventDispatchThread( )" or similar; if the executing thread is not the correct thread then the instruction "invokeAndWaitInvokeANDWait" is used to call the marshalled method code and executing thread waits for the called method to complete on the correct thread.

EXAMPLE 2

"AWT, CallType.Async" represents a call to an asynchronous method in an AWT library: execution of corresponding marshalling source code would check the executing thread is the thread normally associated with the AWT library using an expression "!SwingUtilities.is EventDispatchThread( )" or similar; if the executing thread is not the correct thread then the instruction "invokeLater" is used to call the marshalled method code and executing thread does not wait for the called method to complete on the correct thread.

EXAMPLE 3

"WinForms, CallType.Sync" represents a call to a synchronous method in a WinForms library: execution of corresponding marshalling source code would check the executing thread is the thread normally associated with the WinForms library using an expression "InvokedRequired" or similar; if the executing thread is not the correct thread then the instruction "Invoke( . . . )" is used to call the marshalled method code and executing thread waits for the called method to complete on the correct thread.

EXAMPLE 4

"WinForms, CallType.Async" represents a call to an asynchronous method in a WinForm library: execution of corresponding marshalling source code would check the executing thread is the thread normally associated with the WinForm library using an expression "InvokedRequired" or similar; if the executing thread is not the correct thread then the instruction "BeginInvoke" is used to call the marshaled method code and executing thread does not wait for the called method to complete on the correct thread.

What is claimed is:

1. A method of compiling source code into object code for a multi-threaded runtime environment, comprising:
    compiling source code into object code using a compilation engine;
    identifying marshalling attributes associated with method code intended for executing in a secondary thread; and
    rewriting the marshalling attributes and the method code as marshaled method code for executing the method code in the secondary thread according to the identified marshalling attributes.

2. The method of claim 1, wherein
the marshaled method code includes instructions for having the method code executed in the secondary thread on condition that a thread executing the marshaled method code is not the secondary thread.

3. The method of claim 2, wherein
the marshaled method code further includes instructions for having the executing thread wait, or optionally not wait, for the secondary thread to complete execution of the method code.

4. The method of claim 1, wherein
the method code is compiled object code, the marshaled method code is object code, and the compiling takes place before or during the rewriting step.

5. The method of claim 1, wherein
the marshalling attribute specifies which thread is to execute the method code and which one or more marshalling rules are to be applied to the method code.

6. The method of claim 1, wherein
the marshalling attribute defines whether a thread should operate synchronously or asynchronously.

7. The method of claim 1, wherein
the method code is source code, the marshaled method code is source code, and the compiling takes place after the identifying and the rewriting.

8. A computer hardware system configured to compile source code into object code for a multi-threaded runtime environment, comprising:
    a compilation engine configured to compile compiling source code into object code;
    an identifying component configured to identifying marshalling attributes associated with method code intended for executing in a secondary thread; and
    a rewriting component configured to write the marshalling attributes and associated method code as marshaled method code for executing the method code in the secondary thread according to the identified marshalling attributes.

9. The system of claim 8, wherein
the marshaled method code includes instructions for having the method code executed in the secondary thread on condition that a thread executing the marshaled method code is not the secondary thread.

10. The system of claim 9, wherein
the marshaled method code further includes instructions for having the executing thread wait, or optionally not wait, for the secondary thread to complete execution of the method code.

11. The system of claim 8, wherein
the method code is compiled object code, the marshaled method code is object code; and
the compiling takes place before or during the rewriting.

12. The system of claim 8, wherein
the marshalling attribute specifies which thread is to execute the method code and which one or more marshalling rules are to be applied to the method code.

13. The system of claim 8, wherein
the marshalling attribute defines whether a thread should operate synchronously or asynchronously.

14. The system of claim 8, wherein
the method code is source code, the marshaled method code is source code, and the compiling takes place after the identifying and the rewriting.

15. A computer program product, comprising
a non-transitory computer usable storage medium having stored therein computer usable program code for compiling source code into object code for a multi-threaded runtime environment,
the computer usable program code, which when executed by a computer hardware system, causes the computer hardware system to perform:
- compiling source code into object code using a compilation engine;
- identifying marshalling attributes associated with method code intended for executing in a secondary thread; and
- rewriting the marshalling attributes and the method code as marshaled method code for executing the method code in the secondary thread according to the identified marshalling attributes.

16. The computer program product of claim 15, wherein the marshaled method code includes instructions for having the method code executed in the secondary thread on condition that a thread executing the marshaled method code is not the secondary thread.

17. The computer program product of claim 16, wherein the marshaled method code further includes instructions for having the executing thread wait, or optionally not wait, for the secondary thread to complete execution of the method code.

18. The computer program product of claim 15, wherein the method code is compiled object code, the marshaled method code is object code, and the compiling takes place before or during the rewriting step.

19. The computer program product of claim 15, wherein the marshalling attribute specifies which thread is to execute the method code and which one or more marshalling rules are to be applied to the method code.

20. The computer program product of claim 15, wherein the marshalling attribute defines whether a thread should operate synchronously or asynchronously.

\* \* \* \* \*